United States Patent [19]

Blair, Jr.

[11] 4,260,019

[45] Apr. 7, 1981

[54] METHOD OF RECOVERING PETROLEUM FROM A SUBTERRANEAN RESERVOIR INCORPORATING RESINOUS POLYALKYLENE OXIDE ADDUCTS

[75] Inventor: Charles M. Blair, Jr., Buena Park, Calif.

[73] Assignee: Magna Corporation, Santa Fe Springs, Calif.

[21] Appl. No.: 45,478

[22] Filed: Jun. 4, 1979

Related U.S. Application Data

[63] Continuation-in-part of Ser. No. 917,057, Jun. 19, 1978, abandoned.

[51] Int. Cl.$^3$ .............................................. E21B 43/22
[52] U.S. Cl. .................................... 166/274; 166/275; 252/8.55 D
[58] Field of Search ............... 166/252, 273, 274, 275, 166/295, 305 R; 252/8.55 D

[56] References Cited

U.S. PATENT DOCUMENTS

| | | | |
|---|---|---|---|
| 2,499,365 | 3/1950 | De Groote et al. | 252/338 |
| 3,583,486 | 6/1971 | Stratton | 166/274 |
| 3,610,339 | 10/1971 | Harvey | 166/274 |
| 3,927,716 | 12/1975 | Burdyn et al. | 166/274 X |
| 4,089,803 | 5/1978 | Bessler | 252/8.55 X |

*Primary Examiner*—Herbert B. Guynn
*Attorney, Agent, or Firm*—William C. Norvell, Jr.

[57] ABSTRACT

The method of recovering petroleum from a subterranean reservoir preferably comprising the steps of: (1) introducing through an injection well a predeterminable amount of a polyalkylene oxide adduct of a fusible, water-insoluble organic aromatic hydrocarbon solvent-soluble synthetic resin, wherein said resin has from between about 4 to about 15 phenolic groups and is an alkyl or cycloaliphatic substituted phenol-aldehyde condensate of an ortho- or para-substituted phenol and an aldehyde, said condensate resin being thereafter further condensed with an alkylene oxide containing less than about five carbon atoms in an amount equal to at least one mole of alkylene oxide per phenolic moiety of said resin, said condensation product at about 25° C.: (a) being less than about 1% by volume soluble in water and in isooctane; (b) having a solubility parameter in the range of between about 6.9 and about 8.5; and (c) spreading at the interface between distilled water and refined mineral oil to form a film having a thickness no greater than about 20 Angstroms at a film pressure of about 16 dynes per cm, the weight ratio of oxide to condensation product in a solvent-free state being between about 1-to-10 and about 10-to-1; (2) contacting said petroleum in said reservoir with an effective thin film forming amount of said polyalkylene oxide adduct; (3) and introducing into the formation an aqueous injection medium to urge said petroleum toward and through a producing well.

39 Claims, 3 Drawing Figures

INTERFACIAL ENERGY VALUES PER UNIT AREA OF ROCK SURFACE $E_A = T_1 - T_2 - SP_E + T_3 - T_2 - SP_E$   $E_B = T_1 - T_2 - SP_{SA} + T_3 - T_2 - SP_{SA}$   $E_C = T_1 - T_3 + T_3 - T_2 - SP_{SA}$ $= T_1 - 2T_2 + T_3 - 2SP_E$   $= T_1 - 2T_2 + T_3 - 2SP_{SA}$   $= T_1 - T_2 - SP_{SA}$

DECREASE IN INTERFACIAL ENERGY IN GOING FROM CONDITION 1A TO CONDITION 1C $-\Delta E = E_A - E_C = T_3 - T_2 - 2SP_E + SP_{SA}$   (EQUATION 1)

METHOD OF RECOVERING PETROLEUM FROM A SUBTERRANEAN RESERVOIR INCORPORATING RESINOUS POLYALKYLENE OXIDE ADDUCTS

CROSS-REFERENCE TO RELATED APPLICATIONS

This application is a continuation in part of application Ser. No. 917,057, filed June 19, 1978, now abandoned, entitled "Method Of Recovering Petroleum From A Subterranean Reservoir Incorporating Resinous Polyalkylene Oxide Adducts".

This application is related in subject matter to each of the following applications, filed on even date herewith, and assigned to the same assignee as this application: (1) "Method Of Recovering Petroleum From A Subterranean Reservoir Incorporating A Polyether Polyol", Ser. No. 45,479; (2) "Method Of Recovering Petroleum From A Subterranean Reservoir Incorporating An Acylated Polyether Polyol, Ser. No. 45,360, now U.S. Pat. No. 4,216,828; and (3) "Method Of Recovering Petroleum From A Subterranean Reservoir Incorporating Polyepoxide Condensates Of Resinous Polyalkylene Oxide Adducts And Polyether Polyols", Ser. No. 45,470.

BACKGROUND OF THE INVENTION

1. FIELD OF THE INVENTION

This invention relates to a process for enhancing the recovery of petroleum and bitumen from subterranean strata and petroliferous rocks or sands. More specifically, it relates to new and improved aqueous flooding processes wherein the improvement comprises the utilization of a thin film spreading agent composition of a resinous polyalkylene oxide adduct which facilitates the displacement of petroleum and bitumen from the source rock.

2. DESCRIPTION OF THE PRIOR ART

It has long been known that the natural forces operating to cause flow of oil from source rocks into bore holes penetrating the rock are relatively inefficient in producing the oil. After the completion of such "primary" production, as much as 60% to 95% of the original oil in place may remain in the reservoir stratum.

For this reason, so-called "secondary" and "tertiary" recovery processes are usually applied to the reservoir at some point. Such processes include steam injection to provide additional reservoir energy for subsequent oil production and numerous other recovery methods which have been proposed wherein various fluids are injected into the oil-bearing formation to effect removal and recovery of additional oil from treated wells or from adjacent wells communicating with the reservoir. Such displacement methods are generally referred to as "flooding" and have utilized steam, water, brines, gas, caustic solutions, acidic solutions, aqueous solutions of detergents, high viscosity aqueous solutions of very high molecular weight polymers, oil solutions of detergents, micellar solutions, emulsions, liquified carbon dioxide and combinations of such methods. In some instances, one fluid may be injected for a time and is then followed by another and perhaps less costly fluid, such as water or brine. All such procedures are aimed at removing petroleum trapped in minute pores of the reservoir rock.

Removal of petroleum from its source rock is believed to be a complex process involving the flow of two or more phases through a permeable solid phase. Many variables affect the results. For example, pore size in the rocks, viscosity of fluids, temperature, pressure, wettability characteristics of the rock, the composition of the oil phase and numerous other properties all apparently play a part in the dynamics of petroleum production.

Much of the oil left in the rock formation during primary production appears to be trapped by forces of adhesion between oil and rock. Although not fully understood, most reservoir rocks appear to be "preferentially" wet by water, meaning that the contact angle between water and rock, measured through the water phase, is smaller than the contact angle between crude oil and rock, similarly measured. It is believed that the polar constituents contained in most crude petroleum oils, such as asphaltenes and other complex compounds, become absorbed on the polar rock surfaces to form thick, viscous, hydrophobic films which cause the rock to be wettable or partially wettable by the oil, prevent the close approach of and wetting by any aqueous phases and hinder the displacement and flow of the oil. Even in the presence of interstitial (connate) water or of injected aqueous fluids, only limited water wetting of the formation with displacement of the oil is effected.

Micellar solution flooding systems which are miscible with the petroleum, all of its dissolved components and water, were first disclosed and proposed for oil recovery in U.S. Pat. No. 2,356,205, dated Aug. 22, 1944, to Chas. M. Blair, Jr., and Sears Lehmann, Jr., entitled "Process For Increasing Productivity Of Subterranean Oil-Bearing Strata", the disclosure of which is herein incorporated by reference. These systems are capable of dissolving and removing such trapped oil as they can contact, but have not yet proven to be generally feasible because of the high cost of chemicals, solvents, and hydrotropic agents involved.

Aqueous flooding fluids containing acids, bases or detergent solutes have been employed to improve oil recovery by lowering oil-water interfacial tension sufficiently to lessen back pressure from dynamic surface and interfacial tension (Jamin) effects or to bring about emulsification of oil in the aqueous fluid, but with only limited improvement over the results of ordinary water flooding.

None of these methods has clearly attempted to effect more complete water wetting of the formation by chemical means. Indeed, the use of water- or brine-soluble surfactants, such as detergents, for decreasing oil-water interfacial tension are generally ineffective in decreasing oil wetting or, alternatively, increasing water wetting of highly polar surfaces. Classical wetting theory shows quite generally that the work of adhesion for displacement of oil by water on a rock surface is decreased by lowering the oil/water interfacial tension and, as a consequence, the tendency of the water to displace oil is actually decreased.

Indirectly, aqueous caustic may reduce the oil wettability of rock by reaction with crude oil constituents and reduction of their oil wetting action. However, this method typically requires from $\frac{1}{2}\%$ to 3% of caustic, and sometimes as much as 15%, to reduce the oil-wetting ability of the petroleum. Such high concentrations are costly and, in addition, bring about reactions with injected water or interstitial brine to form plugging precipitates of inorganic compounds such as calcium carbonate, strontium carbonate and magnesium hydroxide, thus stopping or greatly reducing the fluid injection process.

Figures 1A, 1B, 1C:
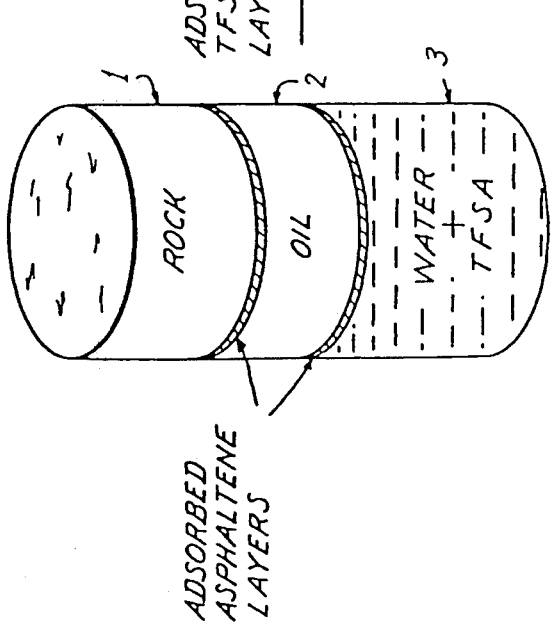
FIG. 1A is a vertical, cylindrical section taken through the reservoir rock 1, its layer of adhering oil (or bitumen) 2, and the adjacent connate (or added) water phase 3. At this stage, which is the instant before the alteration of any interfacial conditions in the reservoir resulting from the introduction of the resinous polyalkylene oxide adduct, the chemical has already been incorporated into the water phase but has not yet contacted or migrated into the oil phase.

Following introduction of the resinous polyalkylene oxide adduct, it may then migrate to the rock surface and spread to displace the thick adsorbed oil wetting layer. Simultaneously, it will be adsorbed at the oil-water interface where it spreads similarly with displacement of any emulsifier film formed there by adsorption of emulsifying agents from the oil, leaving a system as depicted in FIG. 1B.

FIG. 1C depicts the final stage of water wetting of the reservoir rock with displacement of the adhering oil layer, now containing the displaced emulsifier and the resinous polyalkylene oxide adduct, as a droplet suspended in the water phase.

SUMMARY OF THE INVENTION

It is a primary object of this invention to provide an improved flooding process leading to enhanced oil recovery.

Another object is to provide a pretreating flood of a thin film spreading agent composition having present therein a resinous polyalkylene oxide adduct, to improve the recovery of oil by subsequent flooding with water or other aqueous systems such as viscous, aqueous polymer solutions, caustic solutions and detergent solutions.

I have found that the ability of crude oil to wet and adhere to rock surfaces in the presence of water can be substantially reduced by injection of certain classes of organic compositions, not previously described for such use, into the petroleum or bitumen reservoir and that, by suitable application of these compounds ahead of or in conjunction with water and other aqueous fluids, significant increases in the recovery of the petroleum is effected.

I believe that the composition used in the present method, hereinafter referred to as a "Thin Film Spreading Agent", or "TFSA", probably acts by adsorbing preferentially at the petroleumrock interface where it is spread to displace the thick, semisolid film of previously adsorbed, naturally occurring oil-wetting agent from the petroleum, forcing it back into solution or dispersion in the oil phase, leaving in its place a very thin, mobile, monomolecular, semi-polar adsorbed film. The tendency of the oil to adhere to or wet the rock is thereby reduced. As aqueous fluids are pumped into the reservoir, the oil is then more readily pushed away. Also, since the TFSA forms such thin layers on mineral surfaces, it permits close approach of the mineral and aqueous flooding fluids surfaces, sufficiently close, indeed, to permit the powerful short range molecular forces of attraction between polar molecules to become effective and to bring about wetting of the rock by the aqueous fluid. As this oil displacement and water wetting process proceeds, the temporary film of TFSA, itself, is displaced just as the aqueous phase displaces the petroleum phase on the rock, and becomes dispersed in the oil or the flood water to be carried forward toward the untreated portions of the formation. Contact of displaced petroleum with petroleum masses adhering to the rock downstream permits the TFSA to become adsorbed again between oil and rock and to effect further oil displacement by aqueous flooding fluids.

Besides adsorbing on rock surfaces, the asphaltenes and other complex polar constituents in the crude petroleum oil adsorb strongly at interfaces between the oil and water or brine, forming thick, viscous layers which resist flow forces, stabilize viscous emulsions within the flooded rock zone and inhibit oil displacement.

A further object of the invention is to replace such viscous interfacial films with very thin, mobile films of the TFSA and thereby lessen the viscosity of the interstitial oil and water fluids, decrease flow resistance, minimize the formation of interstitial emulsions and increase the production of petroleum oil.

Regardless of any theory or proposed mechanism for the function of the TFSA composition and method, the utility of these products for removal of oil from sand bodies has been clearly established by experiments described below. However, for its possible scientific interest and bearing on the process the steps visualized as occurring in the water wetting of reservoir rock initially wet with a film of oil or bitumen when brought in contact with TFSA are presented in FIG. 1.

The TFSA compound may be introduced as a minute dispersion, a micellar solution or an emulsion in the flood water from which it may migrate and diffuse into the oil phase or spread after adsorption on rock surfaces adjacent to the oil-wet surfaces. Although, as pointed out below, the TFSA compounds are not "soluble" in the conventional macroscopic sense in water or in hydrocarbons of low solubility parameter, they are soluble to some very small microscopic extent sufficient to permit some diffusion through the water phase to the oil, especially at the elevated temperatures found in underground reservoirs. Additionally, contact of minute dispersed particles of, or micelles containing, TFSA with the oil phase as the result of flow of the water phase through the rock will facilitate transfer to the oil phase, as will the active spreading of the TFSA at water-oil interfaces. Still further, the TFSA may actually be introduced as a preliminary batch or "slug" dissolved in an organic solvent for the material to be pushed along by the following flow of injected water.

Referring to FIG. 1B, the water and rock surfaces are now in condition to adhere when they approach closely. In the dynamic process of water injection, the fluid phases of water and oil in the rock can and will undergo some movement and displacement sufficient to bring about the required water-rock contacts from time-to-time.

In order to better visualize the energy changes involved in this process, it is assumed that the cross sections shown are one square centimeter in area and that the oil droplet in FIG. 1C has a surface area of about 1 $cm^2$. This last assumption would be true for an original adhering oil film which was 0.1 cm thick, a rather thick section for most reservoir rocks and, thus, a conservatively high value for the new oil-water interfacial area generated during displacement and of the concomitant energy requirement for its generation.

The energy changes involved are shown on the lower part of the Figs. Here, $T_1$, $T_2$ and $T_3$ are the solid, oil and water specific surface energies, respectively. They are numerically equal to the surface tensions. $SP_E$ is the interfacial spreading pressure of the naturally occurring oil wetting material in the oil and $SP_{SA}$ is the spreading pressure of the TFSA at oil-rock and oil-water interfaces.

The total energy change for the process is shown in Equation 1, as follows:

$$\Delta E = T_3 - T_2 - 2SP_E + SP_{SA} \qquad \text{Equation 1.}$$

In deriving this, it is assumed that interfacial tensions between pure phases are numerically equal to the difference in interfacial tensions of the phases involved, as in Antonoff's Rule. While it is known that this assumption is not exact, since dispersion forces sometimes lead to somewhat different values of interfacial energy (or tension) than predicted by Antonoff's Rule, the minor errors introduced by the assumption are almost wholly eliminated in taking the energy differences involved in the process.

To obtain a numerical estimate of the energy change, $\Delta E$, in Equation 1, the approximate values of the surface energy value involved are needed. Surface energy values for solids are not easily obtained. However, $T_1$, the surface energy value for the rock surface, does not appear in Equation 1 and, thus, does not affect the energy change involved during the process of oil displacement.

$T_2$, the surface energies of petroleum oils are generally about 30 ergs or less per cm$^2$ at 25° C. $T_3$, the surface tension of water, is about 72. Inserting these and other appropriate values into Equation 1, the following is obtained:

$$\Delta E = 72 - 30 - 2(25) + 30 = 22 \text{ ergs per cm}^2$$

This indicates a very favorable free energy change for the oil displacement process. In actual practice it would be expected that an even more favorable free energy change would occur since it is assumed that an unusually large volume of oil is displaced per unit area of rock. Pore sizes of natural oil sand deposits would indicate much smaller volumes which are also expected to coalesce, leading to a maximum energy change value, when ignoring the area of the oil-water interface of $$-\Delta E_{max} = 2(T_3 - T_2 - SP_E)$$

Using the previously estimated energy values, the following equation is obtained:

$$-\Delta E_{max} = 34 \text{ ergs per cm}^2$$

In summary, a favorable overall thermodynamic effect of between about 22 and 34 ergs per cm$^2$ of rock surface is obtained during displacement of typical oils.

However, in order to determine whether the condition depicted in FIG. 1B can proceed to that of FIG. 1C, the free energy change in this step must be examined. Unless it is negative, the displacement process may stop at the state of FIG. 1B, leaving oil adhering to the rock.

Equation 2

$$-\Delta E_{BC} = T_1 - 2T_2 + T_3 - 2SP_{SA\,i} - T_1 + T_2 + SP_{SA}$$
$$= T_3 - T_2 - SP_{SA}$$

Inserting the previously used typical surface energies into Equation 2, the following equation is obtained:

$$-\Delta E_{BC} = 12 \text{ ergs per cm}^2$$

If the final oil-water interfacial area is ignored, this becomes 24 ergs per cm$^2$. These results indicate that the thermodynamics generally will strongly favor the displacement process in preference to the intermediate state of FIG. 1B.

Most petroleum reservoirs have temperatures above 25° C., depending upon depth, the nature of the formation and, perhaps, to the extent of cooling effected by prior treatment. Surface and interfacial energy decline with increases in temperature, so the actual free energy decrease to be expected in actual reservoirs should be somewhat less than indicated above for a temperature of 25° C., but since the fractional declines in surface and interfacial energies with temperature are similar, the free energy decline will remain positive.

DESCRIPTION OF THE PREFERRED EMBODIMENTS

The compositions which have been found to be an effective TFSA in the practice of the invention have the following properties:

1. Solubility in water and isooctane at 25° C. is less than about 1% by volume;

2. Solubility parameter at 25° C. is in the range of about 6.9 to about 8.5 with a preferred range of about 7.0 to about 7.9; and 3. Spread at the interface between distilled water and refined mineral oil to form films which have a calculated thickness no greater than about 20 Angstroms (0.0020 micrometers) at a spreading pressure of about 16 dynes per cm (0.016 Newton per meter).

Products meeting these requirements are generally organic polymers or semi-polymers with average molecular weights between about 800 and 30,000 and have structures which allow orientation on polar surfaces with much or most of the elements of the molecule in a thin plane. To be effectively adsorbed at oil-water or oil-rock interfaces, they must generally contain constituents which give them highly distributed hydrophile and hydrophobe character, and without such concentrations of either hydrophilic or hydrophobic groups as to produce water solubility or oil solubility, in the ordinary macroscopic sense. The compositions appear not to be effective micelle-forming compounds in the manner of detergents, soaps and the surfactants such as those previously used in aqueous floods. They also appear to differ from formerly used surfactants in that their effects on oil-water interfacial tensions as a function of concentration are limited. While spreading efficiently at such interfaces to form thin films with spreading pressures up to about 35 to 40 dynes per cm, addition of larger amounts of TFSA have relatively little effect on interfacial tension. Also, the present agents, in contrast to formerly used surfactants, have relatively little or no tendency to stabilize either oil-in-water or water-in-oil emulsions when present in normal use amounts.

Usually the compositions applicable to the practice of the invention are organic molecules containing carbon, hydrogen and oxygen, although in some instance they may contain sulfur, nitrogen, silicon, chlorine, phosphorous or other elements. Small amounts of inorganic material such as alkalies, acids or salts may appear in the compositions as neutralizing agents, catalyst residues or otherwise. The critical requirements for the compositions are not so much compositional as structural and physical. They must be made up of hydrophilic (polar) moieties, usually ones capable of forming hydrogen bonds, such as hydroxyl, carbonyl, ester, ether, sulfonium, amino, ammonium, phospho or similar hydrogen bonding groups, connected by or to hydrophobic groups, such as alkylene, alkyl, cycloalkyl, aryl, arylene, aralkyl, polyalkylene, polyalkylyne, combinations of such groups and such groups containing relatively non-polar substituents, such as hydrocarbon, chlorine, fluorine and the like. Sometimes the hydrophobic moieties are larger and contain more atoms than the polar groups in the molecule, having a minimum of two carbon atoms in each group and up to as many as 36 carbon atoms, although the actual ratio of sizes depends greatly on the structure of the hydrophilic moiety. Most commonly the hydrophobic groups will contain 14 to 22 carbon atoms and will have linear or sheetlike conformations allowing for relatively flat orientation on surfaces.

Polar moieties other than hydrogen bonding ones are not excluded from these compositions and, indeed, may be deliberately included in some structures to improve adsorption and interfacial spreading tendencies. For example, quaternary ammonium groups, while incapable of forming hydrogen bonds, can improve spreading and interfacial adsorption in some applications by way of their highly ionized form which imparts cationic character to the molecules in which they occur and, via coulombic repulsion effects, can improve spreading in a film.

Generally, the compositions will contain at least two each of the required hydrophilic (polar) and hydrophobic moieties per molecule and commonly will contain many more of each. The effective products, however, must have the three properties described above.

The products useful in the process resemble products which have been found effective for breaking petroleum emulsions, but for most applications for oil recovery the products will tend to be somewhat more or less hydrophobic than the demulsifier actually used on the water-in-oil emulsion produced from the formation to be treated. However, the actual product to be used for a given system is best selected by laboratory tests to be described below rather than by its chemical similarity to demulsifiers or other surface-active agents which may have been used in the system.

While, as pointed out above, the effective TFSA may be derived from a wide variety of chemical reactants and may contain numerous different groups or moieties, I have found that particularly effective products are those which are described as a polyalkylene oxide adduct of a fusible, water-insoluble organic aromatic hydrocarbon solvent-soluble synthetic resin, wherein said resin has from between about 4 to about 15 phenolic groups and is an alkyl or cycloaliphatic substituted phenol-aldehyde condensate of an ortho- or para-substituted phenol and an aldehyde, said condensate resin being thereafter further condensed with an alkylene oxide containing less than about five carbon atoms in an amount equal to at least one mole of alkylene oxide per phenolic moiety of said resin. These adducts must conform to the physical property parameters set forth above.

These compositions are broadly described in U.S. Pat. No. 2,499,365, entitled "Chemical Manufacture", dated Mar. 7, 1950, to DeGroote, et al. These compositions also include materials wherein less than one or two alkylene oxide units may be reacted with each reactive structural group of the starting resin.

The most common resin is an alkyl or cycloaliphatic substituted phenol-aldehyde resin prepared by condensing an ortho- or para-substituted phenol with an aldehyde, most commonly with formaldehyde or a formaldehyde progenitor such as paraformaldehyde or trioxane, under mildly alkaline or acidic conditions to form a fusible and xylene-soluble polymer of low or moderate molecular weight and which typically will contain from between about 4 to about 12 phenolic groups. This resin is then condensed, usually with an alkaline catalyst, with an alkylene oxide or a mixture of alkylene oxides containing 4 or fewer carbon atoms and exemplified by ethylene oxide, propylene oxide, butylene oxide, glyceryl chlorohydrin, epichlorohydrin and glycidol.

To be suitable for use in the present process, addition and condensation of oxide must not be carried to the point of producing water-soluble products. Where ethylene oxide alone is condensed with the resin, the amount added preferably will be between one and five moles per phenolic moiety in the resin. The actual amount will vary with the size of the alkyl or cycloalkylene group attached to the phenol ring as well as, apparently, with the composition and properties of the oil, aqueous phase and rock formation encountered in the method.

Where propylene or butylene oxides or mixtures of one or both of these with ethylene oxide are condensed with the phenolic resin intermediate, generally a greater amount of such oxides may be reacted without leading to extremely polar, water-soluble products. In contrast, the amount of epichlorohydrin or glycerol chlorohydrin which can be condensed without producing agents not meeting the solubility and interfacial spreading criteria defined above is usually somewhat lower.

On a solvent-free weight basis, the amount of alkylene oxide or mixture of oxides condensed with the resin will fall within the range of about one part oxides to about 10 parts of resin and up to 10 parts by weight of oxides to 1 part by weight of resin and preferably from between about 1-to-5 and about 3-to-1. The final product should contain at least about one mole of alkylene oxides per phenolic moiety of the resin.

All final compositions useful in the present invention must have the previously recited properties:
1. Solubility in water and in isooctane at about 25° C. is less than about 1% by volume.

Solubility tests may be run by placing a 1 ml sample (or the weight of solid product calculated to have a volume of 1 ml) in a graduated cylinder of the type which may be closed with a ground glass stopper. Place 100 ml of water in cylinder, close, place in a 25° C. water bath until thermal equilibrium is reached, remove from the bath and shake vigorously for one hour. Return to the bath for five minutes and then repeat the shaking procedure. Finally, return to the bath and allow to stand quietly for one hour. Examine the cylinder contents carefully. Any cloudiness or opacity of the liquid phase or the appearance of any sediment or undissolved material in the cylinder indicates that the product satisfies the requirement for insolubility in water.

Isooctane solubility is determined similarly by substituting this hydrocarbon for the water used above.
2. The solubility parameter (S.P.) at about 25° C. is from between about 6.9 to about 8.5, inclusive.

Methods of determination of solubility parameter are disclosed in Joel H. Hildebrand, "The Solubility of Nonelectrolytes," Third Edition, pages 425 et seq. However, a simplified procedure, sufficiently accurate for qualification of useful TFSA products, may be utilized. Components of a given solubility parameter are generally insoluble in hydrocarbon (non-hydrogen-bonding) solvents of lower solubility parameter than themselves. Therefore, the present compositions should all be soluble in a hydrocarbon solvent of a solubility parameter of about 8.5 and insoluble or incompletely soluble in one having a solubility parameter of about 6.8. Since the solubility parameter of mixtures of solvents is an additive function of volume percentage of components in the mixture, test solutions of the desired solubility parameters may be easily prepared by blending, for example, benzene (S.P. 9.15) and isooctane (S.P. 6.85) or perfluoro-n-heptane (S.P. 5.7).

A mixture of about 72 parts of benzene with about 28 parts of isooctane will provide a solvent having an S.P. of about 8.5 at room temperature (about 25° C.). Perfluoro-n-heptane has an S.P. of 5.7 at 25° C., so a mixture of 68 parts of this solvent with 32 parts of benzene provides a solvent with an S.P. of 6.8, or isooctane of S.P. 6.85 may be used.

When 5 ml of compositions useful in the present process are mixed with 95 ml of the 8.5 S.P. solvent at room temperature, a clear solution should result. When 5 ml of composition is mixed with the 6.85 S.P. solvent, a cloudy mixture or one showing phase separation should result. Solvent mixtures of S.P. 7.0 and 7.9 may be prepared as described above and utilized in a similar test procedure.

In interpreting the solubility parameter and other tests, it should be recognized that in preparing the polymeric compositions useful in the present invention, the resulting end product consists not of a single material or compound but a cogeneric mixture of products containing a range of products of molecular weights distributed around the average molecular weight and even containing small amounts of the starting compounds employed in the synthesis.

As a result, a running solubility and solubility parameter tests very slight appearances of cloudiness or lack of absolute clarity should not be interpreted as a pass or a failure to pass the criteria. The intent of the test is to ensure that the bulk of the cogeneric mixture, say 75% or more, meets the requirement. When the result is in doubt the solubility tests may be run in centrifuge tubes allowing subsequent rapid phase separation by centrifuging, after which the separated non-solvent phase can be removed, any solvent contained in it can be evaporated and the actual weight or volume of separated phase can be determined.

3. The product should spread at the interface between distilled water and refined mineral oil to form films with thickness no greater than about 20 Angstroms (0.0020 micrometer) at a film pressure of about 16 dynes per cm (0.016 Newton per meter).

Suitable methods of determining film pressure are disclosed in N. K. Adam, "PHysics and Chemistry of Surfaces," Third Edition, Oxford University Press, London, 1941, pages 20 et seq., and C. M. Blair, Jr., "Interfacial Films Affecting The Stability Of Petroleum Emulsions", *Chemistry and Industry*, 1960, pages 538 et seq. Film thickness is calculated on the assumption that all of the composition remains on the area of interface between oil and water on which the product or its solution in a volatile solvent has been placed.

Since spreading pressure is numerically equal to the change in interfacial tension resulting from spreading of the film, it is conveniently determined by making interfacial tension measurements before and after adding a known amount of TFSA to an interface of known area.

Alternatively, one may utilize an interfacial film balance of the Langmuir type such as that described by J. H. Brooks and B. A. Pethica, *Transactions of the Faraday Society*, 1964, page 208, et seq., or other methods which have been qualified for such interfacial spreading pressure determinations.

In determining the interfacial spreading pressure of the TFSA products, it is preferred to use as the oil phase a fairly available and reproducible oil such as a clear, refined mineral oil. Such oils are derived from petroleum and have been treated with sulfuric acid and other agents to remove non-hydrocarbon and aromatic constituents. Typical of such oils is "Nujol", distributed by Plough, Inc. This oil ranges in density from about 0.85 to about 0.89 and usually has a solubility parameter between about 6.9 and about 7.5. NUmerous similar oils of greater or smaller density and viscosity are commonly available from chemical supply houses and pharmacies.

Other essentially aliphatic or naphthenic hydrocarbons of low volatility are equally usable and will yield similar values of spreading pressure. Suitable hydrocarbon oils appear in commercial trade as refined "white oils", "textile lubricants", "paraffin oil", and the like. Frequently they may contain very small quantities of alpha-tocopherol (vitamin E) or similar antioxidants which are oil soluble and do not interfere with the spreading measurements.

The compositions suitable for practicing the present invention are prepared by reacting formaldehyde or a substance which breaks down to formaldehyde under the reaction conditions, e.g., paraformaldehyde and trioxane, and a difunctional, with respect to reaction with formaldehyde, alkyl phenol, often a crude mixture of alkyl phenols for economic reasons, by heating the reactants between about 100° and about 125° C. in the presence of a small amount of an acid catalyst such as sulfamic acid or muriatic acid or, alternatively, in the presence of an alkaline catalyst such as sodium hyroxide or sodium methylate and, preferably, under substantially anhydrous conditions, excepting the water produced during the reaction. The aqueous distillate which begins to form is collected and removed from the reaction mixture. After several hours of heating at temperatures slightly above the boiling point of water, the mass becomes viscous and is permitted to cool to about 100°-105° C. At this point, an aromatic hydrocarbon fraction such as xylene may be added, and heating is resumed. Further aqueous distillate begins to form, and heating is continued for an additional number of hours until at least about one mole of aqueous distillate per mole of the formaldehyde has been distilled off. Xylene or other hydrocarbon which may be distilled with the water is returned to the reaction mass. The temperature at the end of the reaction reaches about 180°-250° C. The product is permitted to cool to yield the phenol-formaldehyde condensation product in the aromatic solvent.

The molecular weight of these intermediate condensation products cannot be ascertained with certainty, but it is estimated that the resins employed herein should contain from between about 4 to about 15, preferably from about 4 to about 6, phenolic nuclei per resin molecule. The solubility of the condensation product in hydrocarbon solvent would indicate that the resin is a linear or sheet-like polymer, thus distinguishing it from the more common phenol-formaldehyde resins of the insoluble cross-linked type.

Having prepared the intermediate phenol-formaldehyde products, the next step is the oxyalkylation of the condensation products with alkylene oxide. This is achieved by mixing the intermediate phenol-formaldehyde condensation product as is or contained in the aromatic solvent with a small amount of a suitable catalyst, usually potassium hydroxide or sodium methylate, in an autoclave. The condensation product is heated above 100° C., and ethylene oxide, propylene oxide, butylene oxide or mixtures of two or all three of these oxides, either as a mixture or by sequential addition of first either one or another of the oxides is charged into the autoclave until the pressure is in the vicinity of 75–100 psi.

The reaction mixture is gradually heated until an exothermic reaction begins. The external heating is then removed, and alkylene oxide or oxide mixture is added at such a rate that the temperature is maintained between about 130°–160° C. in a pressure range of 30–100 psi. After all of the alkylene oxide has been added, the temperature is maintained for an additional 10 to 20 minutes to assure substantially complete reaction of the alkylene oxide. The resulting product is the alkylene oxide adduct of an alkyl phenol-formaldehyde condensation product, in which the weight ratio of the oxide to the condensation product (on a solvent-free basis) is between about 1-to-10 and about 10-to-1, preferably between about 1-to-5 and about 3-to-1, and containing at least about one mole of alkylene oxide per phenolic moiety of the resin.

The invention is further illustrated in the following examples:

EXAMPLE I

P-nonyl phenol is employed as the alkyl phenol to produce a resin by the procedure described above, employing a small amount of dinonyl phenol sulfonic acid as catalyst. After completion of the resin-forming reaction the acid is neutralized with aqueous KOH and an excess of about 0.2% KOH is further added. Water is removed by warming under a vacuum for one hour after which the vessel is closed and a mixture of equal weights of propylene and ethylene oxide is then added in an amount equal to three times the weight of nonyl phenol-formaldehyde resin (solvent-free basis) such additions being carried out under about 40 psi pressure over a three-hour period. The product meets the three criteria set forth above for establishing and determining utility in the present invention.

EXAMPLE II

Into a 4,000 gal. stainless steel reactor, equipped with steam heating and cooling coils, stirrer, reflux and take-off condensers, steam vacuum jet and inlet feed lines, were placed:

| | |
|---|---|
| High boiling aromatic solvent | 5,200 lbs. |
| Paraformaldehyde | 120 lbs. |
| Para-tertiary amyl phenol | 4,600 lbs. |

After warming to 55° C. while stirring, 68 lbs. of 50% aqueous caustic soda solution were introduced. A mildly exothermic reaction ensued. The condensor was opened to a decanter, the steam jet was activated and a vacuum of 26 inches of mercury was held on the vessel for a period of 2½ hours during which the temperature was gradually raised to 165° C. At this point resin formation is essentially complete.

150 lbs. of additional 50% caustic soda were then introduced and a full vacuum applied while continuing heating for one hour. The vessel was then closed, cooled to 135° C. and then was introduced:

Ethylene Oxide, 3,050 lbs. at a rate which maintained a temperature of about 125°–130° C.

Aromatic Solvent, 3,000 lbs. were then added, the batch was cooled and filled into drums.

A sample, after vacuum distillation to remove aromatic solvent, met the three required tests, set forth above.

Selection of the best TFSA product for use in a given field application is best done by laboratory test procedures which have been found to have predictive value for other enhanced recovery methods. For disclosures of such procedures, reference is made to procedures given in "Oil-in-Water Emulsions and Their Flow Properties in Porous Media," by C. D. McAuliffe, *Journal of Petroleum Technology*, June 1973, p. 727, et seq., and to U.S. Pat. No. 3,163,214, entitled "Solvent-Waterflood Oil Recovery Process," issued Dec. 29, 1964, to Csaszar, each of the disclosures being herein incorporated by reference.

Among such procedures, one which has been found useful in selecting a suitable TFSA involves a determination of oil displacement efficiency from prepared oil-containing rock cores in equipment described below. A tube of glass or transparent polymethacrylate ester, having an inside diameter of about 3.5 cm (1½ inches) and a length of about 45 cm (18 inches), is fitted with inlet connections and appropriate valves at each end. The tube is mounted vertically on a rack in an air bath equipped with a fan, heater and thermostat which allows selection and maintenance of temperatures in the range of between about 25°–130° C.

To select the most efficient TFSA for use in a given oil formation, samples of the oil, of the producing rock formation and of the water to be used in the flooding operation were obtained. The formation rock is extracted with toluene to remove oil, is dried and is then ground in a ball mill to the point where a large percentage passes a 40 mesh sieve. The fraction between 60 and 100 mesh in size is retained. The tube described above is removed from the air bath, opened and, after insertion of a glass wool retainer at the lower end, is packed with the ground formation rock. The tube is tapped gently from time-to-time during filling to ensure close packing and is visually inspected to assure absence of voids.

The tube is then returned to the air bath, connected to the inlet tubing, the temperature is adjusted to the oil formation temperature and oil from such formation is admitted slowly through the bottom line from a calibrated reservoir in an amount just sufficient to fill the packed rock plug in the tube. This volume is determined from the calibrations and is referred to as the "pore volume", being that volume of oil just sufficient to fill the pores or interstices of the packed plug of rock.

The tube is now closed and left in the air bath at the selected temperature for a period of from one to, perhaps, five days to allow establishment of equilibrium between the ground formation rock and the oil with respect to adsorption of oil constituents on the rock and lowering of interfacial tension. The time allowed for equilibrium may be varied widely. At higher temperatures, the time required to reach equilibrium is probably reduced. Usually, for comparative tests, three days are allowed to age the oil-rock plug. Results with this procedure closely simulate work with actual cores of oil-bearing rock.

The oil and water samples used for test purposes are preferably taken under an inert gas such as high purity nitrogen, and are maintained out of contact with air during all manipulations in order to prevent oxidation of the oil and concomitant introduction of spurious polar, surface-active constituents in the oil. At this point, the rock-oil system simulates the original oil formation before primary production of oil was commenced and well before any secondary waterflood operation.

The upper inlet line to the tube is now connected to the sample of water used in the flooding of the oil formation and, by means of a syringe pump or similar very small volume positive displacement pump, the water is pumped into the sand body from the top to displace fluids out of the bottom tubing connection into a calibrated receiver. The pumping rate is adjusted to one simulating the rate of flood water advance in an actual operation, which is usually in a range of 1 to 50 cm per day. Pumping is maintained at this rate until several pore volumes of water have been pumped through the sand.

The volumes of fluids collected in the receiver are measured and the relative amount of oil and water displaced from the rock sample are determined and recorded. Of special interest is the volume of oil displaced as a fraction of the original pore volume. This information may be viewed as an indication of the approximate percentage of oil originally in place which is produced by natural water drive following drilling of a well into the rock formation followed by the primary phase of field production.

Following this step, several additional pore volumes of water containing the TFSA composition to be tested are pumped slowly through the plug and the volumes of additional oil and water displaced are determined. Alternatively, the TFSA composition dissolved in a relatively small volume of organic solvent or emulsified in a relatively small volume of water, may be pumped into the plug and followed with several pore volumes of flood water. Typically, where such an initial "slug" of TFSA is introduced it may be contained in a volume of fluid ranging from 1% to 100% of the pore volume, but most frequently it will be in a slug volume of 10% to 50% of pore volume.

After this final displacement step, the produced oil and water are again measured. By comparing the amount of oil produced by this additional injection of water containing, or preceded by a solution, of TFSA with the amount produced when the same volume of water containing no TFSA is injected, one can evaluate the effectiveness of the particular TFSA composition used for enhancing the recovery of additional oil over and above that obtained by ordinary waterflooding alone.

EXAMPLE III

Into a 4,000 gal. reactor like that of Example II (vessel No. 1) were placed:

| | |
|---|---|
| Commercial mixed xylenes | 1,800 lbs. |
| p-nonyl phenol | 2,400 lbs. |
| p-tertiary butyl phenol | 1,600 lbs. |
| Dodecylbenzene sulfonic acid | 20 lbs. |

Into a separate smaller stainless steel vessel (vessel No. 2) equipped with an efficient stirrer, heating coils and a pumping system allowing transfer of contents to the 4,000 gal. reactor were placed:

| | |
|---|---|
| Commercial mixed xylenes | 2,800 lbs. |
| Dodecylbenzene sulfonic acid | 8 lbs. |
| Paraformaldehyde flakes | 850 lbs. |

While vigorously stirring the contents of vessel No. 2 and heating to a temperature of about 75° C., water in the amount of 600 lbs. was added. Stirring and heating to a temperature of 75° C. were continued to produce a white, creamy uniform slurry.

The contents of vessel No. 1 were brought to about 95° C. and the slurry in vessel No. 2 was slowly pumped into vessel No. 1, while stirring both. The temperature in vessel No. 1 was maintained at about 95° to 105° C. either by control of the rate of slurry addition or, if necessary, by heating.

After the slurry addition was completed, the temperature of the contents of vessel No. 1 was slowly raised to about 150° C. and water was distilled off by way of the take-off condensor. After evolution of water ceased, the temperature was further increased slowly to about 205° C. and held sufficiently long to strip out about 150 lbs. of the mixed xylenes solvent.

After removal of the xylene, the temperature was lowered to about 135° C. and 50 lbs. of flaked, 91% potassium hydroxide was added to the contents with stirring. The condensor was then connected to a vacuum system and heating was continued for one hour while holding a vacuum of 26 inches, or more, of mercury.

The vessel was then closed and the following mixture was slowly introduced from a separate vessel:

| | |
|---|---|
| Ethylene oxide | 6,600 lbs. |
| Propylene oxide | 2,140 lbs. |

A mildly exothermic reaction ensued which allowed maintenance of a temperature from 135° to 155° C. during the mixed oxide addition. After addition of oxides was completed, the temperature was lowered to 125° C. and the contents held under a vacuum for one hour to remove any traces of unreacted oxides. The vacuum was then disconnected, the product was allows to cool and finally was filled into 55-gal. steel drums.

Tests of product after removal of the xylene solvent showed it to be insoluble to the extent of 1% in both distilled water and isooctane. When spread at the interface between Nujol and distilled water at 25° C., this product produced a film pressure of 20 dynes per cm at a calculated thickness, assuming all the added product remained at the interface, of 12.5 Angstroms. The product had a solubility parameter of 8.2, determined by the procedure described above.

EXAMPLE IV

A core from the oil-producing Ranger Zone of the Wilmington, California, field was ground and packed as described in the test description above. Oil from the same field was used to saturate the ground rock after which it was held for two days at 50° C. The pore volume was found to be 121 ml. Three pore volumes of water used in this field for flooding of the zone were pumped through and the volume of displaced oil was recorded. This is called "primary" production.

0.1 ml of the product of Example I, above, was then dispersed by vigorous stirring into 0.2 pore volume of water which was slowly pumped into the rock and then followed by 3.8 pore volumes of water containing no additional TFSA agent. Pumping was at a rate to complete the injection in 30 hours. The additional oil produced in this step, referred to as "secondary" production, was recorded.

A test, similar to the above in all respects, except that no TFSA was used, was then run. The difference in oil volume produced in the first run minus the volume produced in the second (blank) run is a measure of the inrease in production effected through use of the TFSA compound. The numerical results of this test are shown in Table I. The final results are shown as percentage inrease in oil produced based on the pore volume of oil originally in place in the rock column.

The results of further tests, employing another TFSA composition made as in Example II, in another oil, water and rock system is also presented in Table I.

Where the TFSA composition was introduced into the system in the form of an emulsion or in solution in an organic solvent, the blank (comparison) run was always conducted with the same amount of emulsifier or of solvent as that used with the TFSA composition in order that effects of the latter should be clearly defined.

All tests were run with the equipment and procedure described above, except where indicated.

Use of a properly selected TFSA composition is seen to provide very significant increases in the amount of oil produced over that obtainable by ordinary waterflooding.

ground formation rock were only 34 cm in length. Core rock of 60 to 100 mesh was prepared from a core from the Ranger Zone of the Wilmington, California, field. The packed tube was saturated with Ranger Zone crude oil and soaked for three days at 65° C. Pore volume was found to be 90 ml.

After the soaking period, water used for flooding in the Wilmington field, heated to 65° C., was pumped slowly through the column until two pore volumes (180 ml) of water had been injected into the column. The oil displaced from the sand column by this process was collected and measured along with the water which accompanied it. Oil production to this point simulates the primary phase of production.

At this time, 20 ml of a 0.025% dispersion of the product of Example III in flood water was slowly pumped into the column as a pretreatment slug. This solution was prepared by adding 5 ml of a 1% solution of the product of Example III in 96% isopropanol with 15 ml of flood water while stirring vigorously.

After completing the slug solution injection, flood water containing 250 ppm of the product of Example III was injected dlowly into the column until a total of five pore volumes (450 ml) of water, including the 20 ml slug, had been pumped into the column.

A record was kept of the amount of oil produced as a function of the volume of water injected.

An exactly identical test was run in which none of the product of Example III was employed but the isopropanol and plain flood water were substituted for the slug. This test is referred to as the Blank.

Still another identical test was run in which Wyandotte Chemical Corporation nonionic surfactant PLURONIC L-64 was substituted for the product of Example III. PLURONIC L-64 is a block copolymer of propylene and ethylene oxide containing about 45% ethylene oxide. It has been recommended for use in waterflooding to improve the secondary recovery of petroleum. See, for example, C. G. Inks and R. I. Lahring, Journal of Petroleum Technology, 20, 1320 (1968).

PLURONIC L-64 is clearly soluble in distilled water to the extent of more than 1%, forming clear, foamy solutions. Therefore, it does not pass at least one of the critical tests required herein of the TFSA.

Each of these three tests was run in triplicate, the results for each were averaged and are presented in Table II.

TABLE 1

| Example Number | TFSA Used | Amount Used, ml. | Method of Introduction | Temperature °C. | Pore Volumes ml. | Pore Volumes of Water- Primary | Pore Volumes of Water- Secondary | Total ml. oil Produced | Percentage Increase in Oil Produced |
|---|---|---|---|---|---|---|---|---|---|
| Tests with Oil, Water and Rock from Wilmington, Calif. Field | | | | | | | | | |
| Blank | None | — | — | 50 | 121 | 3 | 4 | 24.3 | — |
| V | Example I | 0.10 | Dispersion | 50 | 121 | 3 | 4 | 26.1 | 7.4 |
| Tests with Oil, Water and Rock from East Texas Field | | | | | | | | | |
| Blank | None | — | — | 70 | 125 | 3 | 3 | 56.3 | — |
| VI | Example II | 0.15 | Xylene Slug | 70 | 125 | 3 | 3 | 74.3 | 40.0 |

EXAMPLE VII

An apparatus like that described in Example IV was employed, except that the cyliners containing the

TABLE II

| Pore Volumes of Water Pumped Into Column (PV = 90 ml) | Volume of Oil Produced (ml) | | | Increased Oil Production Over That With Blank, % | |
|---|---|---|---|---|---|
| | Blank Tests | With Wyandotte PLURONIC L-64 Added After 2 PV | With Product of Example III Added After 2 PV | Using Wyandotte PLURONIC L-64 | Using Product of Example III |
| 0.5 | 19.8 | — | — | — | — |
| 1.0 | 25.2 | — | — | — | — |
| 1.5 | 29.3 | — | — | — | — |
| 2.0 | 32.0 | — | — | — | — |
| Chemical Injection Started After 2 Pore Volumes | | | | | |
| 2.5 | 34.7 | 35.1 | 35.6 | 1.2 | 2.6 |
| 3.0 | 37.8 | 37.9 | 38.8 | 0.3 | 2.6 |
| 3.5 | 39.6 | 39.8 | 42.3 | 0.5 | 6.8 |
| 4.0 | 41.0 | 41.4 | 45.3 | 1.0 | 10.5 |
| 4.5 | 42.0 | 42.7 | 46.8 | 1.7 | 11.4 |
| 5.0 | 42.8 | 43.2 | 47.9 | 0.9 | 11.9 |

It appears that PLURONIC L-64 may have a small positive effect on oil recovery. However, the product of Example III showed a very substantial effect on oil recovery and one which increases with the amount of water injected.

IMPLEMENTATION OF THE INVENTION

As indicated above, introduction of the TFSA composition into the waterflood process may be accomplished in numerous ways. Simplest, perhaps, is the continuous introduction, with rapid dispersion such as may be obtained through a centrifugal pump, into the flood water stream. The amount required varies with the formation being treated, the character of the oil and water and the specific TFSA composition used, but will generally be within the range of from between about 5 to about 300 ppm of flood water injected. Occasionally, with especially viscous and refractory oils of high asphaltene content or where lower reservoir temperatures are encountered, somewhat higher concentrations of up to 500 to 2,000 parts per million may be more effective.

An especially useful and effective means of application is that of introducing the TFSA composition into the water stream as an emulsion. The compositions generally may be emulsified with one of numerous commercially available emulsifying agents, either cationic, anionic or nonionic or mixtures thereof. The compositions may also be incorporated into micellar or transparent emulsions of extremely small size for injection into the water stream. The previously cited U.S. Pat. No. 2,356,205, dated Aug. 27, 1944, to Blair and Lehmann shows numerous micellar emulsion formulae into which TFSA compositions may be incorporated by relatively minor changes in formulation.

Rather than introduce the compositions continuously into the flood water, one may, often with greater effect and lower cost, introduce a higher concentration of compound for only a part of the time. Commonly, this takes the form of batch or slug treatment early in the history of the flooding operation usually to be continued for a period of time covering up to 1% to about 20% of the estimated total time of water injection. Occasions may arise where two or more periods of batch treatments are utilized.

Where slugs or batches are employed, the concentration of TFSA composition injected is higher than for the continuous injection case, very roughly in proportion to the ratio of the total volume of water to be injected to the volume of the slug. Generally, however, it has been found that results equivalent to those obtained with continuous treatment can be accomplished with less TFSA if an early or "front end" slug is introduced.

Instead of introducing an aqueous slug one may inject a solution of the TFSA in a suitable organic solvent. Such solvents include hydrocarbons with solubility parameters equal to or above that of the selected TFSA, such as, for example, benzene, xylene, toluene, certain aromatic petroleum fractions, turpentine, tetralin and the like. Alternatively, polar or semipolar solvents in wide variety may be used. Satisfactory solvents for most TFSA compositions include hexanol, cresol, butanol, diisobutyl ketone and mixtures of such solvents with hydrocarbons. It is preferred to use solvents with relatively low water solubility. These, too, are usually the most readily available and economic solvents to use. In some applications it may be highly desirable to incorporate viscosity increasing agents into the organic solution slugs in order to better distribute the fluid into the formation being flooded and to lessen excessive penetration into more permeable or "thief" strata.

Effective "thickening" or viscosity increasing agents include polybutylene, polyisoprene, polyacrylic acid esters and other high molecular weight polymers which are soluble in organic solvents.

The improvements in oil recovery possible from use of TFSA compositions is not limited to ordinary waterfloods. Positive enhancement of results are also obtainable in connection with other so-called "chemical" or "surfactant" waterfloods, including polymer or pusher floods, where water-soluble polymers of high molecular weight are dissolved in the water to impart higher viscosity and improved distribution; micellar floods, such as those described previously; caustic floods; silicate floods; detergent floods; emulsion floods; amine floods; and others wherein some soluble additive is added to the flood water.

In all such applications the range of concentrations and use rates of the selected TFSA is about the same as with simple waterflooding. In most of these applications the use of a front end slug treatment is desirable, possibly excepting the case of polymer or pusher floods where the injection of at least some polymer ahead of the selected TFSA may be indicated by reservoir characteristics.

In general, it is highly desirable to institute the use of the TFSA composition as soon as possible after waterflooding, pressure maintenance or any such water injection program is started. Early contact of reservoir oil with the TFSA facilitates its production by natural as well as artificial water drive.

Nevertheless, since most ordinary secondary waterflood operations leave a large fraction of the oil in the producing strata, it is often economically feasible to carry out a second waterflooding operation (tertiary recovery) utilizing the present invention for the recovery of additional oil.

Other variations and combinations of enhanced recovery procedures employing the present invention will be apparent to those skilled in the art of petroleum and bitumen production.

For example, large deposits of viscous oils are known to exist in the United States, Venezuela and elsewhere in extensive shallow, cool, sand formations where little reservoir energy exists to produce flow of the oil into bore holes. Such formations appear amenable to flooding with hot water which can be further enhanced in effectiveness by addition of a properly selected TFSA composition in accordance with this invention.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. The method of recovering petroleum from a subterranean reservoir comprising the steps of: (1) introducing into said reservoir a predeterminable amount of a polyalkylene oxide adduct of a fusible, water-insoluble organic aromatic hydrocarbon solvent-soluble synthetic resin, wherein said resin has from between about 4 to about 15 phenolic groups and is an alkyl or cycloaliphatic substituted phenol-aldehyde condensate of an ortho- or para-substituted phenol and an aldehyde, said condensate resin being thereafter further condensed with an alkylene oxide containing less than about five carbon atoms in an amount equal to at least one mole of alkylene oxide per phenolic moiety of said resin, said condensation product at about 25° C.: (a) being less than about 1% by volume soluble in water and in isooctane; (b) having a solubility parameter in the range of between about 6.9 and about 8.5; and (c) spreading at the interface betweem distilled water and refined mineral oil to form a file having a thickness no greater than about 20 Angstroms at a film pressure of about 16 dynes per cm, the weight ratio of oxide to condensation product in a solvent-free state being between about 1-to-10 and about 10-to-1; and (2) contacting said petroleum in said reservoir with an effective thin film forming amount of said polyalkylene oxide adduct.

2. The method of claim 1 wherein said alkylene oxide contains less than $C_5$.

3. The method of claim 1 wherein said ethylene oxide is present in said adduct in an amount between about 1 and about 5 moles per phenolic moiety in said resin.

4. The method of claim 1 wherein said resin is an alkyl phenol-formaldehyde condensate.

5. The method of claim 1 wherein said condensate is further condensed with said alkylene oxide within a substantially solvent-free environment.

6. The method of claim 1 wherein the alkylene oxide is at least one of a member selected from the class consisting of ethylene oxide, propylene oxide, and butylene oxide.

7. The method of claim 1 wherein said weight ratio of oxide to condensation product is between about 1-to-5 and about 3-to-1.

8. The method of recovering petroleum from a subterranean reservoir comprising the steps of: (1) introducing into said reservoir a predeterminable amount of a polyalkylene oxide adduct of a fusible, water-insoluble organic aromatic hydrocarbon solvent-soluble synthetic resin, wherein said resin has from between about 4 to about 15 phenolic groups and is an alkyl or cycloaliphatic substituted phenol-aldehyde condensate of an ortho- or a para-substituted phenol and an aldehyde, said condensate resin being thereafter further condensed with an alkylene oxide containing less than about five carbon atoms in an amount equal to at least one mole of alkylene oxide per phenolic moiety of said resin, said condensation product at about 25° C. (a) being less than about 1% by volume soluble in water and in isooctane; (b) having a solubility parameter in the range of between about 6.9 and about 8.5; and (c) spreading at the interface between distilled water and refined mineral oil to form a film having a thickness no greater than about 20 Angstroms at a film pressure of about 16 dynes per cm, the weight ratio of oxide to condensation product in a solvent-free state being between about 1-to-10 and about 10-to-1; (2) contacting said petroleum in said reservoir with an effective thin film forming amount of said polyalkylene oxide adduct; and (3) introducing into the reservoir an injection medium to urge said petroleum through and out of said reservoir.

9. The method of claim 8 wherein said alkylene oxide contains less than $C_5$.

10. The method of claim 8 wherein said ethylene oxide is present in said adduct in an amount between about 1 and about 5 moles per phenolic moiety in said resin.

11. The method of claim 8 wherein said resin is an alkyl phenol-formaldehyde condensate.

12. The method of claim 8 wherein said condensate is further condensed with said alkylene oxide within a substantially solvent-free environment.

13. The method of claim 8 wherein the alkylene oxide is at least one of a member selected from the class consisting of ethylene oxide, propylene oxide, and butylene oxide.

14. The method of claim 8 wherein said weight ratio of oxide to condensation product is between about 1-to-5 and about 3-to-1.

15. The method of recovering petroleum from a subterranean reservoir penetrated by an injection well and a producing well, comprising the steps of: (1) introducing through said injection well a predeterminable amount of a polyalkylene oxide adduct of a fusible, water-insoluble organic aromatic hydrocarbon solvent-soluble synthetic resin, wherein said resin has from between about 4 to about 15 phenolic groups and is an alkyl or cycloaliphatic substituted phenol-aldehyde condensate of an ortho- or para-substituted phenol and an aldehyde, said condensate resin being thereafter further condensed with an alkylene oxide containing less than about five carbon atoms in an amount equal to at least one mole of alkylene oxide per phenolic moiety of said resin, said condensation product at about 25° C.: (a) being less than about 1% by volume soluble in water and in isooctane; (b) having a solubility parameter in the range of between about 6.9 and about 8.5; and (c) spreading at the interface between distilled water and refined mineral oil to form a film having a thickness no greater than about 20 Angstroms at a film pressure of about 16 dynes per cm, the weight ratio of oxide to condensation product in a solvent-free state being between about 1-to-10 and about 10-to-1; and (2) contacting said petroleum in said reservoir with an effective thin film forming amount of said polyalkylene oxide adduct.

16. The method of claim 15 wherein said alkylene oxide contains less than $C_5$.

17. The method of claim 15 wherein said ethylene oxide is present in said adduct in an amount between about 1 and about 5 moles per phenolic moiety in said resin.

18. The method of claim 15 wherein said resin is an alkyl phenol-formaldehyde condensate.

19. The method of claim 15 wherein said condensate is further condensed with said alkylene oxide within a substantially solvent-free environment.

20. The method of claim 15 wherein the alkylene oxide is at least one of a member selected from the class consisting of ethylene oxide, propylene oxide, and butylene oxide.

21. The method of claim 15 wherein said weight ratio of oxide to condensation product is between about 1-to-5 and about 3-to-1.

22. The method of claim 1 or 15 wherein said polyalkylene oxide adduct is introduced into said reservoir in the form of an emulsion.

23. The method of claim 22 wherein said emulsion is a micellar emulsion.

24. The method of claim 1 or 15 wherein said polyalkylene oxide adduct is incrementally introduced into said reservoir.

25. The method of claim 1 or 15 wherein said polyalkylene oxide adduct is introduced into said reservoir with an organic solvent.

26. The method of claim 25 wherein said organic solvent is a member selected from the class consisting of benzene, xylene, toluene, an aromatic petroleum fraction, turpentine and tetralin.

27. The method of claim 25 wherein said organic solvent is a member selected from the class consisting of hexanol, cresol, butanol, diisobutyl ketone and hydrocarbon mixtures thereof.

28. The method of recovering petroleum from a subterranean reservoir penetrated by an injection well and a producing well, comprising the steps of: (1) introducing through said injection well a predetermined amount of a polyalkylene oxide adduct of a fusible, water-insoluble organic aromatic hydrocarbon solvent-soluble synthetic resin, wherein said resin has from between about 4 to about 15 phenolic groups and is an alkyl or cycloaliphatic substituted phenol-aldehyde condensate of an ortho- or parasubstituted phenol and an aldehyde, said condensate resin being thereafter further condensed with an alkylene oxide containing less than about five carbon atoms in an amount equal to at least one mole of alkylene oxide per phenolic moiety of said resin, said condensation product at about 25° C.: (a) being less than about 1% by volume soluble in water and in isooctane; (b) having a solubility parameter in the range of between about 6.9 and about 8.5; and (c) spreading at the interface between distilled water and refined mineral oil to form a film having a thickness no greater than about 20 Angstroms at a film pressure of about 16 dynes per cm, the weight ratio of oxide to condensation product in a solvent-free state being between about 1-to-10 and about 10-to-1; (2) contacting said petroleum in said reservoir with an effective thin film forming amount of said polyalkylene oxide adduct; and (3) introducing into the reservoir an injection medium to urge said petroleum toward and through said producing well.

29. The method of claim 28 wherein said alkylene oxide contains less than $C_5$.

30. The method of claim 28 wherein said ethylene oxide is present in said adduct in an amount between about 1 and about 5 moles per phenolic moiety in said resin.

31. The method of claim 28 wherein said resin is an alkyl phenol-formaldehyde condensate.

32. The method of claim 28 wherein said condensate is further condensed with said alkylene oxide within a substantially solvent-free environment.

33. The method of claim 28 wherein the alkylene oxide is at least one of a member selected from the class consisting of ethylene oxide, propylene oxide, and butylene oxide.

34. The method of claim 28 wherein said weight ratio of oxide to condensation product is between about 1-to-5 and about 3-to-1.

35. The method of claim 8 or 28 wherein said injection medium is a flood water.

36. The method of claim 8 or 28 wherein said injection medium is a flood water and said polyalkylene oxide adduct is present in said medium in an amount of between about 5 ppm and about 2,000 ppm.

37. The method of claim 8 or 28 wherein said polyalkylene oxide adduct is introduced into said reservoir in the form of an emulsion.

38. The method of claim 37 wherein said emulsion is a micellar emulsion.

39. The method of claim 8 or 28 wherein said polyalkylene oxide adduct is incrementally introduced into said reservoir.

* * * * *